US005655284A

United States Patent [19]

Ferrill et al.

[11] Patent Number: 5,655,284

[45] Date of Patent: Aug. 12, 1997

[54] FIXTURE FOR USE IN PREPARING TWISTED PAIR CABLES FOR ATTACHMENT TO AN ELECTRICAL CONNECTOR

[75] Inventors: Jess Britt Ferrill, Madison; Kevin Hudson Snead, Greensboro, both of N.C.

[73] Assignee: The Whitaker Corp., Wilmington, Del.

[21] Appl. No.: 441,858

[22] Filed: May 16, 1995

Related U.S. Application Data

[63] Continuation-in-part of Ser. No. 334,172, Oct. 31, 1994, Pat. No. 5,592,739.

[51] Int. Cl.$^6$ .................................................... B23P 23/00

[52] U.S. Cl. ........................... 29/566.3; 29/755; 29/868; 156/380.6; 156/530

[58] Field of Search .................................. 29/34 D, 33 F, 29/33 M, 566.1, 566.3, 745, 749, 868, 755; 156/379.8, 380.6, 380.8, 510, 530, 583.1

[56] References Cited

U.S. PATENT DOCUMENTS

| | | | |
|---|---|---|---|
| 3,226,278 | 12/1965 | Scofield et al. . | |
| 3,953,916 | 5/1976 | Rolland et al. | 29/566.3 |
| 4,381,208 | 4/1983 | Baverstock | 156/52 |
| 4,486,253 | 12/1984 | Gonia | 156/51 |
| 4,577,920 | 3/1986 | Coldren et al. | 339/143 R |
| 4,601,530 | 7/1986 | Coldren et al. | 339/103 M |
| 4,713,023 | 12/1987 | Bixler et al. | 439/393 |
| 4,767,355 | 8/1988 | Phillipson et al. | 439/425 |
| 4,767,891 | 8/1988 | Biegon et al. | 174/34 |
| 4,974,311 | 12/1990 | Tran | 29/566.3 |
| 5,005,611 | 4/1991 | Hecker | 140/147 |
| 5,010,642 | 4/1991 | Takahashi et al. | 29/868 |
| 5,147,215 | 9/1992 | Pritulsky | 439/344 |
| 5,165,167 | 11/1992 | Dechelette | 29/566.3 X |
| 5,509,195 | 4/1996 | Watanabe | 29/755 |

FOREIGN PATENT DOCUMENTS

| | | |
|---|---|---|
| 2 249 222 | 4/1992 | United Kingdom . |

*Primary Examiner*—S. Thomas Hughes

[57] ABSTRACT

An apparatus and method for preparing the end of a cable which may be used in the fabrication of a Category 5 patch cord cable assembly. The apparatus includes a cable clamp subassembly and bonding members located between wire combs that position the cable wires side by side. The wires are bonded by heating elements located in the bonding members. These heating elements comprise wires mounted on a printed circuit board. The printed circuit board heater members can be replaced so that wires with different insulation and/or different sizes can be prepared by the tool. Exposed wire pairs are untwisted and laced in the wire combs. A cable clamp prevents the portion of the wires remaining in the cable jacket from untwisting. An insert is placed between two of the wires and the other six wires to improve near end crosstalk performance. The upper bonding subassembly is then rotated into place and the ends of the wires are bonded. The cable clamp is then shifted, moving the wires, and the wires are cut to length. The bonded wire ends are then in the proper preselected order for insertion into an RJ-45 modular plug, for example, to fabricate a patch cord assembly meeting Category 5 requirements.

20 Claims, 14 Drawing Sheets

10
32
34
36
38
38
42
44
46
48
66
68
80
82
84
86
88
100
104
106

FIXTURE FOR USE IN PREPARING TWISTED PAIR CABLES FOR ATTACHMENT TO AN ELECTRICAL CONNECTOR

CROSS REFERENCE TO RELATED APPLICATIONS

This application is a continuation-in-part of application Ser. No. 08/334,172, filed Oct. 31, 1994, now U.S. Pat. No. 5,592,739.

This invention is especially adapted for use with patch cord assemblies, which can be fabricated using cables and modular plugs such as those shown in U.S. patent application Ser. No. 08/332,218, filed on Oct. 31, 1994 and now U.S. Pat. No. 5,571,035, filed in the name of one of the inventors of this application and commonly assigned.

BACKGROUND OF THE INVENTION

1. Field of the Invention

This invention relates to interconnection schemes for use primarily with telecommunication devices such as patch cords or cable assemblies. More particularly, this invention relates to an electrically, balanced connector assembly and to an assembly fixture for fabricating the connector assemblies and patch cord assemblies.

2. Description of the Prior Art

Communication system and/or network efficiency is directly dependent upon the integrity of the connector scheme employed. Such connector schemes include, for example, standard interfaces for equipment/user access (outlet connector), transmission means (horizontal and backbone cabling), and administration/distribution points (cross-connect and patching facilities). Regardless of the type or capabilities of the transmission media used for an installation, the integrity of the wiring infrastructure is only as good as the performance of the individual components that bind it together and to the way in which these components are assembled.

By way of example, a non-standard connector or pair scheme may require that work area outlets be rewired to accommodate a group move, system change, or an installation with connecting hardware whose installed transmission characteristics are compatible with an existing application but are later found to have inadequate performance when the system is expanded or upgraded to higher transmission rates. Accordingly, connecting hardware without properly qualified design and transmission capabilities, can drain user productivity, compromise system performance and pose a significant barrier to new and emerging applications.

Reliability, connection integrity and durability are also important considerations, since wiring life cycles typically span periods of ten to twenty years. In order to properly address specifications for, and performance of telecommunications connecting hardware, it is preferred to establish a meaningful and accessible point of reference. The primary reference, considered by many to be the international benchmark for commercially based telecommunications components and installations, is standard ANSI/EIA/TIA-568 (TIA-568) Commercial Building Telecommunications Wiring Standard. A supplement Technical Systems Bulletin to TIA-568 is TIA/EIA TSB40 (TSB40), Additional Transmission Specifications for Unshielded Twisted-Pair Connecting Hardware. Among the many aspects of telecommunications wiring covered by these standards are connecting hardware design, reliability and transmission performance.

Accordingly, the industry has established a common set of test methods and pass/fail criteria on which performance claims and comparative data may be based.

To determine connecting hardware performance in a data environment, it is preferred to establish test methods and pass/fail criteria that are relevant to a broad range of applications and connector types. Since the relationship between megabits and megahertz depends on the encoding scheme used, performance claims for wiring components that specify bit rates without providing reference to an industry standard or encoding scheme are of little value. Therefore, it is in the interest of both manufacturers and end users to standardize performance information across a wide range of applications. For this reason, application independent standards, such as TIA-568 and TSB40, specify performance criteria in terms of hertz rather than bits. This information may then be applied to determine if requirements for specific applications are complied with. For example, many of the performance requirements in the IEEE 802.3 (10BASE-T) standard are specified in megahertz, and although data is transmitted at 10 Mbps for this application, test "frequencies" are specified in the standard (as high as 15 MHZ).

Transmission parameters defined in TSB40 for unshielded twisted pair (UTP) connectors include attenuation and near-end crosstalk (NEXT) and return loss.

Connector attenuation is a measure of the signal power loss through a connector at various frequencies. It is expressed in decibels as a positive, frequency dependent value. The lower the attenuation value, the better the attenuation performance. Attenuation may be defined as a measure of signal power loss due to the connecting hardware and is derived from swept frequency voltage measurements on short lengths of 100-ohm twisted pair test leads before and after splicing-in the connector under test. The worst case attenuation of any pair within a connector shall not exceed the values listed below in TABLE I, where for Category 5, the values correspond approximately with attenuation that is equivalent to a 2 meter cable,

TABLE I

UTP Connecting Hardware Attenuation

| Frequency (MHZ) | Category (dB) |
|---|---|
| 1.0 | 0.1 |
| 4.0 | 0.1 |
| 8.0 | 0.1 |
| 10.0 | 0.1 |
| 16.0 | 0.2 |
| 20.0 | 0.2 |
| 25 | 0.2 |
| 31.25 | 0.2 |
| 62.5 | 0.3 |
| 100 | 0.4 |

Connector crosstalk is a measure of signal coupling from one pair to another within a connector at various frequencies. Since crosstalk coupling is greatest between transmission segments close to the signal source, near-end crosstalk (as opposed to far-end) is generally considered to be the worst case. Although measured values are negative, near-end crosstalk (NEXT) loss is expressed in decibels as a frequency dependent value. The higher the NEXT loss magnitude, the better the crosstalk performance. Near-end crosstalk loss, the more significant problem, may be defined as a measure of signal coupling from one circuit to another within a connector and is derived from swept frequency voltage measurements on short lengths of 100-ohm twisted-pair test leads terminated to the connector under test. A balanced input signal is applied to a disturbing pair of the connector while the induced signal on the disturbed pair is measured at the near-end of the test leads. In other words, NEXT loss is the way of describing the effects of signal coupling causing portions of the signal on one pair to appear on another pair as unwanted noise. This will become more clear in a description of the test data which appears in TABLE III. In any case, the worst case NEXT loss, see values below in TABLE II, for any combination of disturbing and disturbed pairs is determined by the formula:

$$NEXT(F). \geqq .NEXT\ (16)-20\ \text{Log}\ (F/16)$$

where NEXT (16) is the minimum NEXT loss at 16 MHZ, F is frequency (in MHz) in the range from 1 MHZ to the highest referenced frequency, and NEXT (F) is the performance at that frequency.

TABLE II

UTP Connecting Hardware NEXT Loss Limits
As Specified in EIA/TIA Document TSB-40

| Frequency (MHZ) | Category 5 (dB) |
|---|---|
| 1.0 | >65 |
| 4.0 | >65 |
| 8.0 | 62 |
| 10.0 | 60 |
| 16.0 | 56 |
| 20.0 | 54 |
| 25 | 52 |
| 31.25 | 50 |
| 62.5 | 44 |
| 100 | 40 |

Connector return loss is a measure of the degree of impedance matching between the cable and connector. When impedance discontinuities exist, signal reflections result. These reflections may be measured and expressed in terms of return loss. This parameter is also expressed in decibels as a frequency dependent value. The higher the return loss magnitude, the better the return loss performance.

Since connecting hardware is generally considered to be electrically short relative to signal wavelengths, return loss requirements are only applied to products that have lengths of internal wiring or circuitry of six inches or more (such as patch panels).

The net effect of these parameters on channel performance may be expressed in signal-to-noise ratio (SNR). For connecting hardware, the parameter that has been found to have the greatest impact on SNR is near-end crosstalk.

Several industry standards specify multiple performance levels of unshielded twisted pair (UTP) cabling components have been established. For example, Category 3, 4 and 5 cable and connecting hardware are specified in EIA/TIA TSB-36 & TIA/EIA TSB40 respectively. In these specifications, transmission requirements for Category 3 components are specified up to 16 MHZ. Category 3 will typically be applicable for transmission rates up to 10 Mbps, such as 4 Mbps Token Ring and 10BASE-T.

Transmission requirements for Category 4 components are specified up to 20 MHZ. Category 4 will typically support UTP voice and IEEE 802 series data applications with transmission rates up to 16 Mbps, such as Token Ring.

Transmission requirements for Category 5 components are specified up to 100 MHZ. They are expected to support UTP voice as well as emerging video and ANSI X3T9 series data applications with transmission rates up to 100 Mbps, such as 100 Mbps Twisted-Pair Physical Media Dependent (TP-PMD).

In order for a UTP connector to be qualified for a given Performance category, it must meet all applicable transmission requirements regardless of design or intended use. The challenge of meeting transmission criteria is compounded by the fact that connector categories apply to worst case performance. For example, a work area outlet that meets Category 5 NEXT requirements for all combinations of pairs except one, which meets Category 3, may only be classified as a Category 3 connector (provided that it meets all other applicable requirements).

In a recent development that utilizes a load bar insert for use with a modular plug, while offering improved performance at Category 5 levels, a performance level known in the art, was introduced by Stewart Connector Systems, Inc. of Glen Rock, Pa. They introduced a Category 5 performing modular plug utilizing a sliding wire management bar, where such bar contains two rows, each with four through holes, to receive the standard eight wires of a cable. To use the management bar, the user is advised to arrange the wires in two equal sets, and cut each set of four at a 45 degree angle such that no two wires are of the same length. With the prepared wires, the wires are individually fed into the holes of the wire organizer, in sliding engagement therewith, then trimmed to the same length. For the loading step, the wire organizer is first pushed to the end of the trimmed wires, then inserted into the connector housing. In the fashion of U.S. Pat. No. 4,601,530, when the wire organizer can no longer move forward, the wires are pushed beyond the wire organizer into a position to be individually terminated, as known in the art. While claiming to provide Category 5 performance, the assembly and termination of the modular plug is very labor intensive. This prior art approach also requires the use of long and short terminals, because adjacent wires are no longer side by side when terminated. Therefore standard modular plug electrical connectors cannot be used for this approach.

Prior art RJ-45 modular plugs can be used for Category 5 patch cord assemblies. AMP Incorporated manufactures and sells 100 ohm and 150 Category 5 unshielded and shielded patch cord assemblies. These commercially available patch cord assemblies are fabricated by hand and loading bar inserts or simple separator inserts are not employed. The manufacturing yield for these prior art cables is quite low. Operators find it difficult to manipulate the short cable ends required to maintain Category 5 performance. Unsatisfactory performance may be caused when the lay or relative orientation of the twisted pair wires in a Category 5 cable is altered by "milking" the wires to simplify termination. The nonsequential orientation of Orange/White and White/Orange wires also causes assembly problems and introduces near end crosstalk problems. Thus even though the cable and the connectors may separately meet Category 5 performance specifications, the assembled patch cord does not meet those specifications.

In a companion patent application, filed concurrently with this application's parent application by one of the inventors hereof, where such companion application was assigned U.S. Ser. No. 08/332,218, an improved load bar insert is disclosed. The invention thereof, where the application is incorporated herein in its entirety, relates to an electrical connector, preferably a modular plug. A preferred embodiment of the invention of said companion application comprises a dielectric housing having a conductor receiving end, a conductor terminating end, a passageway communicating internally between the respective ends, and a spacing insert in the passageway to receive a plurality of conductors and to position same in a manner to achieve Category 5 performance levels in the modular plug. The insert is characterized by having an upper surface and a lower surface to receive or position selected pairs of the conductors. Within the limits of the housing, the insert maximizes the separation of the selected pairs and arranges them in plural planes before being realigned into a common plane for termination at the conductor terminating end. A first embodiment includes grooves in the upper and lower surfaces of the insert, while a second embodiment is directed to a rod like member, such as may be made of an elastomer, styrofoam, or plastic tube. A feature of this companion invention is the provision of separating the wires into plural planes, then bringing them together for loading into the modular plug. By incorporating the method of this invention, improved performance levels are ensured in a timely and cost efficient manner.

The procedure by which this invention supports the performance and loading of the modular plug of the companion application, and its ability to generally improve the speed in which modular plugs may be factory terminated, will become apparent in the description which follows, particularly when read in conjunction with the accompanying drawings.

SUMMARY OF THE INVENTION

The assembly or preassembly fixture comprising the preferred embodiment of this invention is used to simplify the termination of electrical connectors to multiple wires in a cable. More specifically, this invention simplifies the attachment of modular plug electrical connectors to Category 5 twisted pair cables so the final patch cord assembly meets category 5 performance specifications.

An object of this assembly fixture and this method of preparing cables is to improve the manufacturing yield for cable assemblies, such as patch cord cable assemblies. Only a simple change of printed circuit board heating members is needed for this fixture to be used to terminate different types of discrete wires using different insulating materials with different outer diameters.

The bench tool version of this fixture can be used by a relatively unskilled operator. The operator need only lace color coded wires into position and then activate a power supply to bond the cable ends. The tool can be connected to conventional power supplies that are readily available in most manufacturing facilities. The tool then cuts the cable to length with the wires fixed in a predetermined order for insertion into a modular plug electrical connector. The fixture thus permits cable preparation without untwisting the wires for more than about 0.5 inches so that cross talk performance is not unacceptably altered.

The fixture comprises a cable clamp positioned adjacent two combs used to align twisted pair wires clamped in the cable clamp. A bonding member, such as a printed circuit board heater subassembly, is located between the combs and the discrete wires are bonded together. In the preferred embodiment, the insulation on the wire ends is heated to bond or fuse the adjacent wires. The preferred heater member comprises side by side resistance heating wires connected to a power supply by traces on the printed circuit board. Similar heater members can be located above and below the area in which the wires are to be bonded. The bonded portion of the cable is cut to length by cutting blades. The cable clamp is movable to permit upper and lower cutting blades to engage the cable after bonding. The heater members are located on an upper and a lower subassembly. The upper subassembly is movable out of the way to permit the wires to be laced into the combs. The upper cutting blade is a part of the upper subassembly.

The preferred embodiment of this fixture is used to bond a small section of the end of a cable wires in the preselected order that complies with EIA/TIA (TSB40) standards for Category 5 patch cord assemblies. The wires in three pairs are positioned side by side, but the remaining two wires are positioned on opposite sides of the central wire pair. An insert is positioned between the wires of this last wire pair to space the last pair from the other three wire pairs to improve the cross talk performance involving these two wires.

The heater elements comprise printed circuit board subassemblies that can be easily removed to match the heater members with the specific size and type of wires used in a specific cable.

BRIEF DESCRIPTION OF THE DRAWINGS

FIG. 2 is a top view of one typical configuration and FIG. 3 is a bottom view of the same terminated configuration. FIG. 4 is a top view of a second typical terminated configuration and FIG. 5 is a bottom view of the second typical configuration. These two typical configurations show that the precise manner in which the twisted pairs are untwisted may vary.

FIG. 13 is a view showing all of the wires positioned in the front and rear combs in alignment with the lower heating element with the wires forming one pair extending over an insert and with the other three pairs of this cable positioned below the insert. FIG. 13 also diagrammatically shows the rotation of the upper heating subassembly into position.

DETAILED DESCRIPTION OF THE PREFERRED EMBODIMENT

Figure 1:
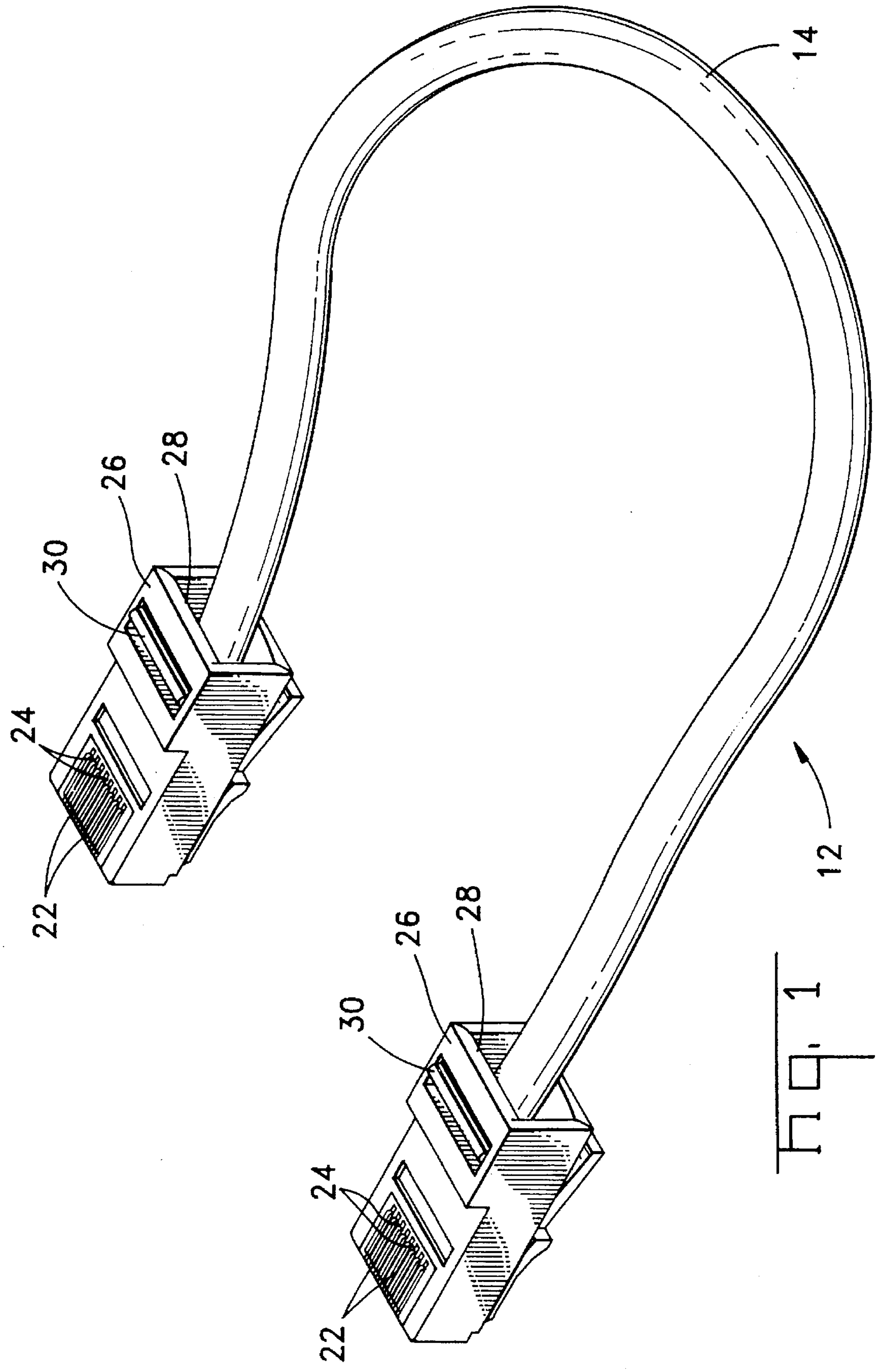
FIG. 1 is a view of a patch cord assembly of the type which can be used in a Local Area Network with unshielded or shielded twisted wire pairs, and of the type which can meet the specifications of EIA/TIA TSB40 Category 5.
Figure 2:
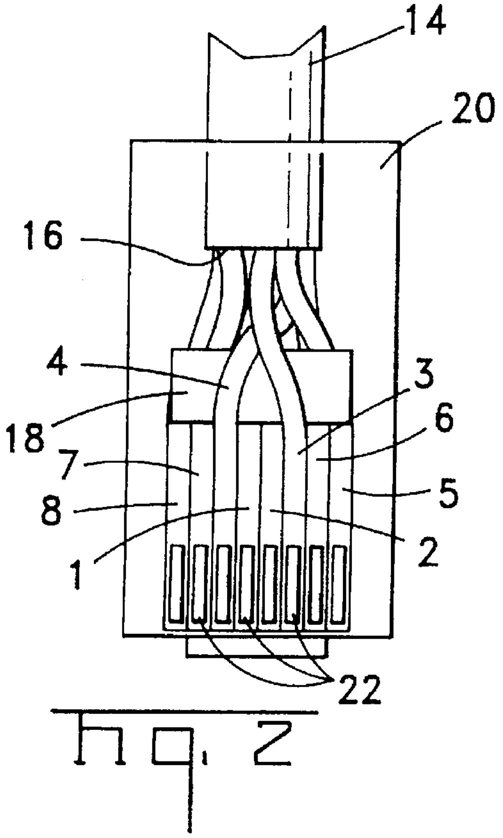
FIGS. 2–5 show two typical configurations of a standard RJ-45 modular plug electrical connector terminated to the eight wires in four twisted pairs in one pattern (568A) dictated by EIA/TIA TSB40 Category 5 specifications.

FIG. 1 is a view of a single patch cord cable assembly 12 of the type which can be used in a Local Area Network, such as an IEEE 100 BASE-T network. The patch cord cable assembly 12 can meet the requirements of EIA/TIA TSB40 Category 5 and would be suitable for use in asynchronous transfer mode (ATM) and other high speed communications. These assemblies are used to connect switches, hubs, computers and other components of a network employing unshielded twisted pair cable.

The patch cord cable assembly 12 includes a cable 14 including four twisted wire pairs consisting of eight wires 1–8 as identified in FIGS. 2–6. A patch cord cable assembly 12 must have the wires in this order and must exhibit certain transmission characteristics, such as mutual capacitance, characteristic impedance, attenuation and near end crosstalk (NEXT) in order to be considered a Category 5 cable. For patch cord cable assemblies near end crosstalk (NEXT) is the most critical and difficult to achieve. As with most standards, certain details of the EIA/TIA TSB40 standards are subject to change in later revisions, especially conformance criteria. As used herein EIA/TIA TSB40 Category 5 standards are to be understood to refer to the most recent version, revision, or draft in existence as of the filing date of this application. All other references to standards are to be interpreted in the same manner.

Figure 3:
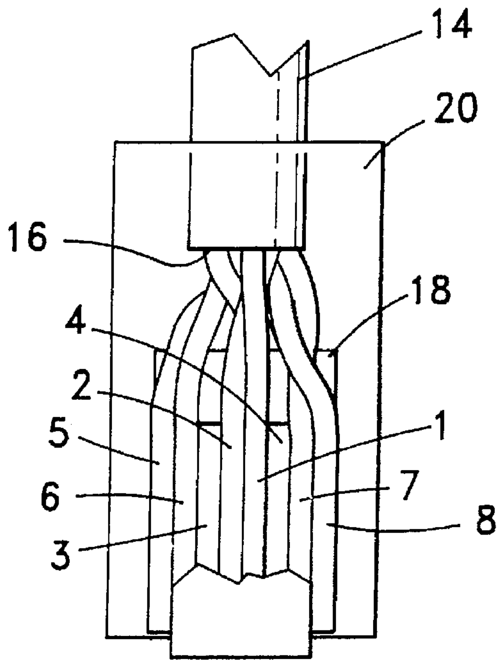
Figure 4:
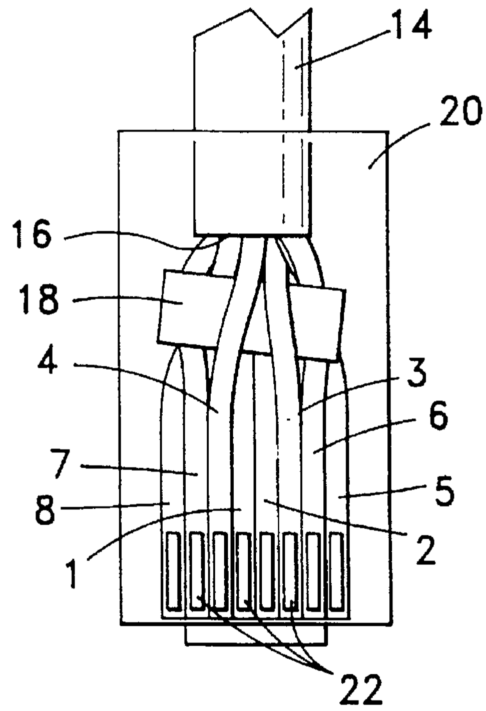
Figure 5:
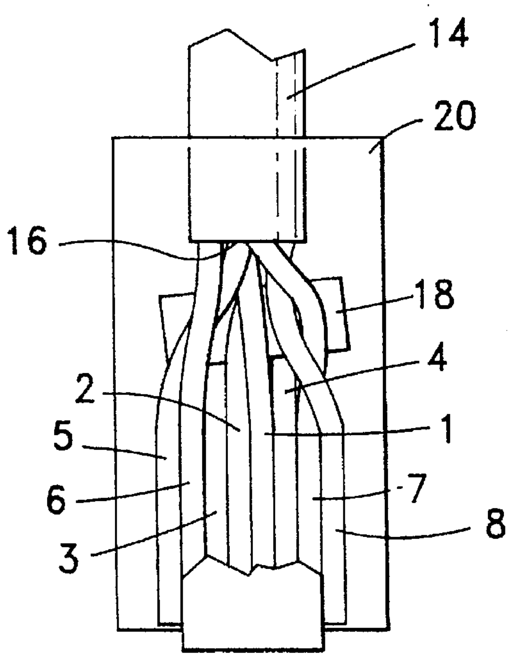
Figure 16:
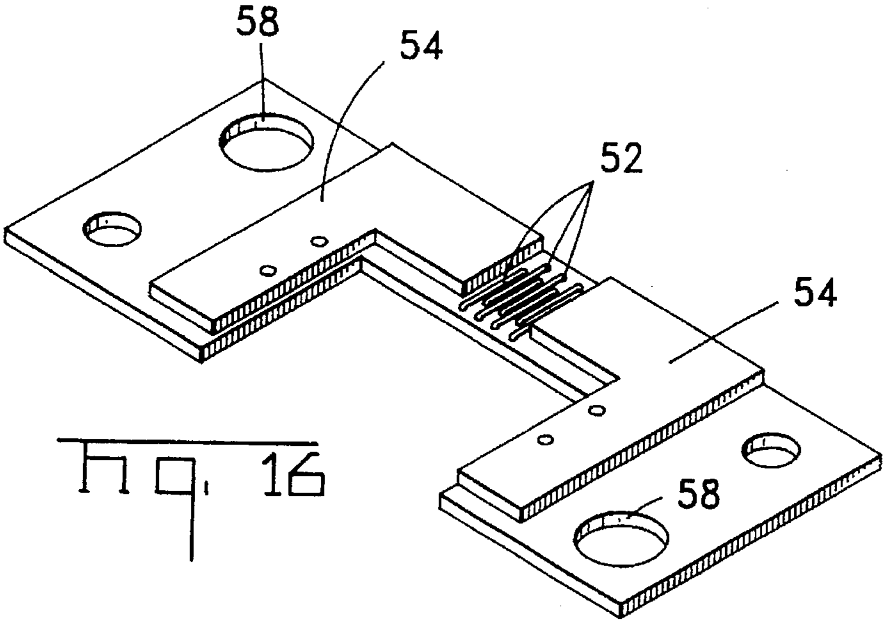
FIG. 16 shows one printed circuit board heating element with the individual heating wires and the spacers on opposite sides.
Figure 6:
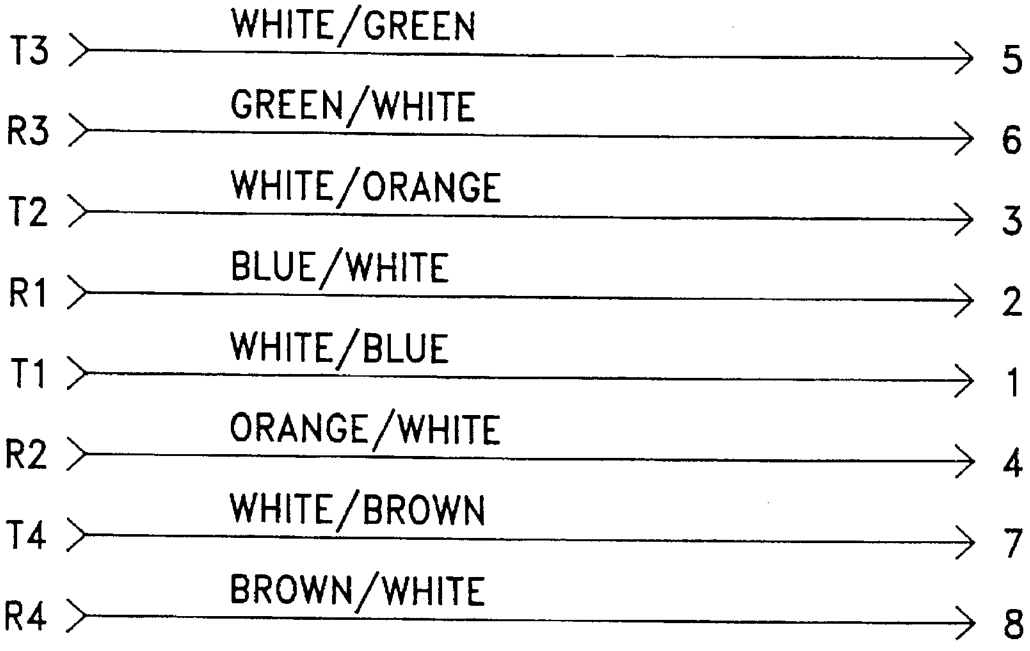
FIG. 6 is a diagram showing the line assignments of the eight conductors forming the four twisted pairs in the order in which they would be terminated in a RJ-45 modular plug electrical connector pursuant to EIA/TIA TSB40 Category 5. The color code shown is the 568A pattern.

The cable 14 in patch cord assembly 12 is circular in cross section and the lay of the twist for each of the four twisted wire pairs is different to minimize crosstalk. The eight wires 1–8 in the cable are terminated to the terminals 22 in the following order, 5,6,3,2,1,4,7,8. As shown in FIG. 6, wires 1 and 2 are the tip (T1) and ring (R1) wires of the first pair. Similarly wires 3 and 4 form the second pair, wires 5 and 6 form the third pair and wires 7 and 8 form the final pair. These wires are color coded as shown in FIG. 6. Note that the wires of three of the pairs are positioned side by side at the terminated position, but the wires 3 and 4 of the second pair are separated. The wires 1 and 2 of the first pair are located between the wires 3 and 4, or corresponding terminals for the wires of this pair. The other two pairs are located on the other side of wires 3 and 4. This is the standard order in which the wires are terminated in an RJ-45, or standard eight position, modular plug electrical connector. Close examination of FIGS. 2–5 show that the transition between the positions of the twisted wires in the cable 14 and the side by side configuration in which they are terminated by terminals 22. Comparison of FIG. 2 with FIG. 4 will show the unrepeatable nature of this transition for wires 3 and 4. FIGS. 3 and 5 show the different manner in which the other wires can be deployed. FIGS. 2–5 are only intended to show two typical transitional configurations for these eight wires. Each example of a terminated connector can be slightly different depending on the precise point in which the cable is terminated, the direction in which the wires are untwisted and possibly other factors. These slight variations are not critical and FIGS. 2–5 merely represent that the wire deployment or transition is not precise and completely repeatable.

The modular plug 20 to which the wires in the cable are terminated is a standard RJ-45 modular plug with eight identical terminals or blades for penetrating the insulation surrounding each wire and for establishing electrical contact with the solid or stranded wire. The terminals 22 are located adjacent the front of the modular plug between separator ribs 24 shown in FIG. 22. A shroud 26 having an open mouth 28 is located at the rear of the plug. A strain relief 30 is located on the top of the shroud and the shroud engages the wires in the shroud when pressed down during termination of the modular plug.

FIGS. 2–5 do show the use of an insert 18 which causes the two wires 3 and 4 to be deployed in a different manner from the other six wires in this Category 5 cable assembly. The insert 18 in this embodiment is a cylindrical member that is deployed between the end of cable jacket 16 surrounding the four wire pairs and the position in which the wires are terminated to the standard terminals 22 in the standard RJ-45 modular plug. The insert is positioned between the strain relief 30 and the terminals 22. Other inserts, such as the loading bar insert shown in U.S. patent application Ser. No. 08/334,172 filed Oct. 31, 1994, could also be employed. The manner in which the wires are preassembled around the simple insert depicted herein and fixed for termination to a standard modular plug will be discussed in more detail with reference to the preferred embodiment of the assembly fixture 10 depicted in FIGS. 7–19.

Figure 7:
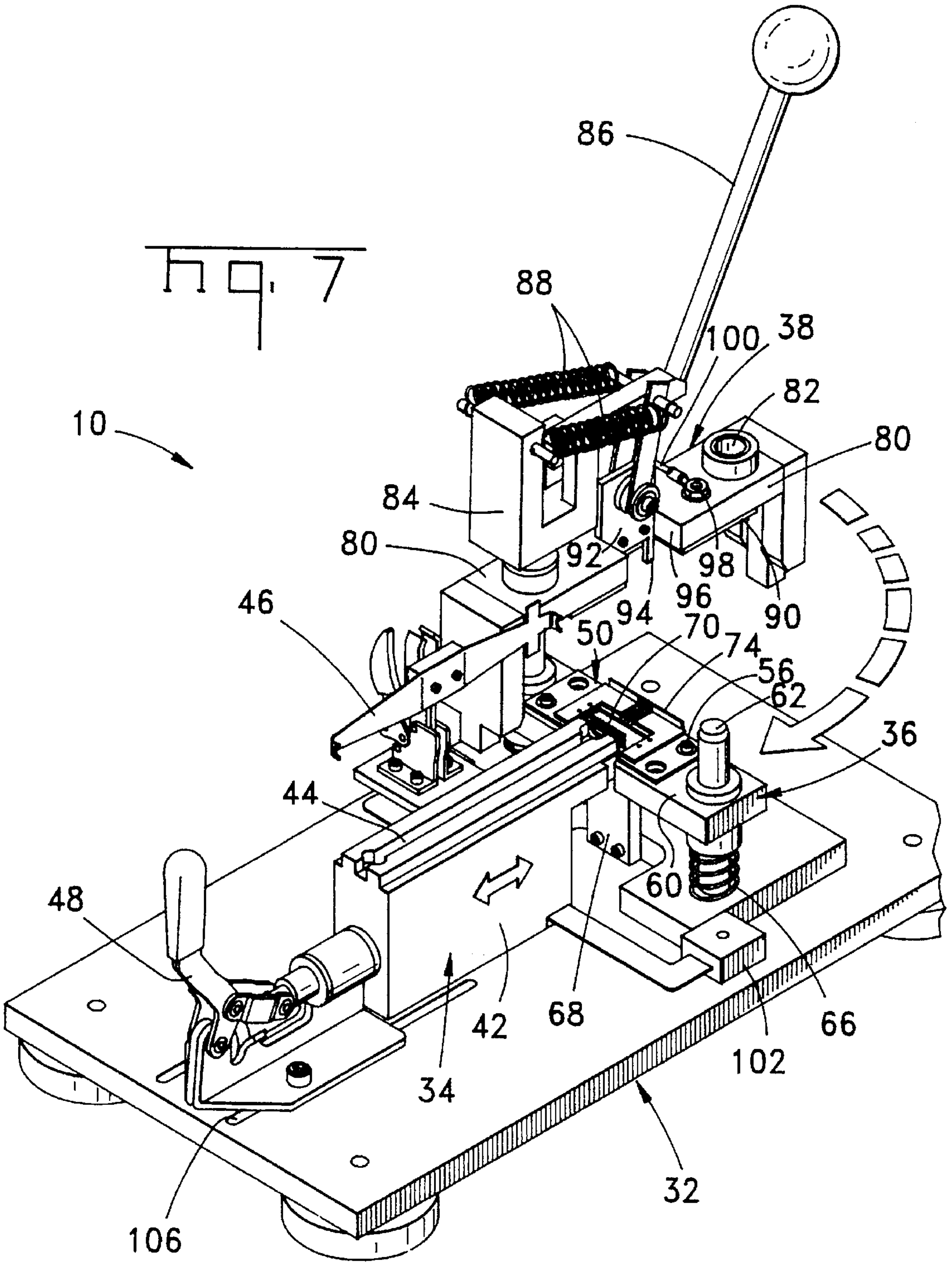
FIG. 7 is a perspective view of the preferred embodiment of the cable preparation fixture in the position in which the wires of a twisted pair cable can be positioned in the fixture.
Figure 8:
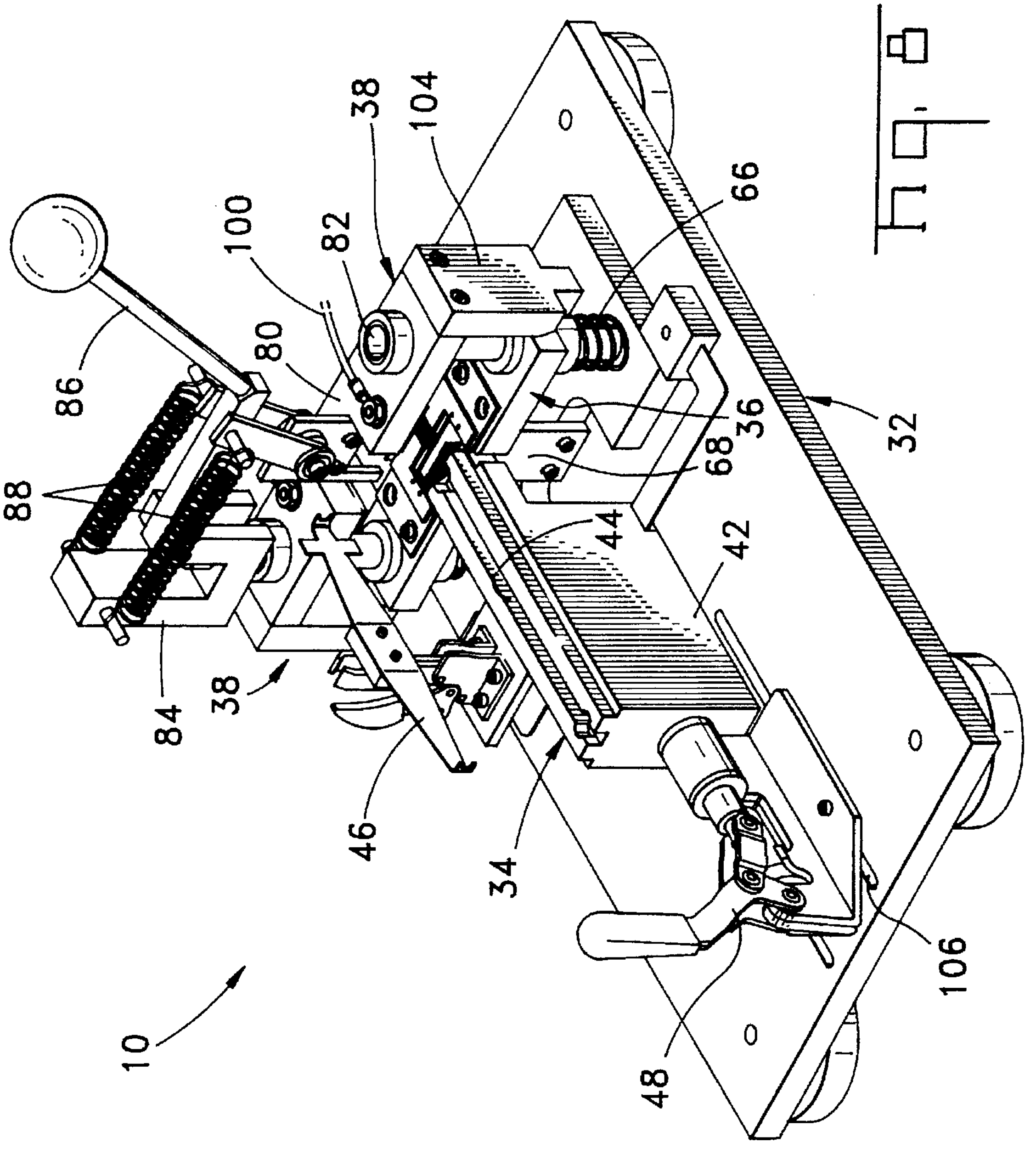
FIG. 8 is a view similar to FIG. 7 showing the fixture in a second position with the heating elements on the fixture aligned.

FIG. 7 is a perspective view of a fixture 10 for preparing a cable containing discrete twisted wire pairs to simplify reliable assembly of the cable to a modular plug electrical connector. The specific fixture shown in FIG. 7 is a bench tool suitable for preparing one end of a cable containing four twisted pairs to an eight position RJ-45 modular plug. This fixture 10 is suitable for preparing the cable for use in a Category 5 patch cord cable assembly 12 as shown in FIG. 1. FIG. 7 shows the fixture in an initial position in which the cable and wires can be laced into the tool. FIG. 8 shows the tool with the upper subassembly rotated into position for bonding the ends of the wires together by heating the insulation surrounding the individual wires to fuse the wires into a short ribbon section. In the preferred embodiment this fixture fixes the wires in position for termination by using heat to bond adjacent wires. It should be understood that other means could be employed to fix the wires in an appropriate configuration, either for termination as a Category 5 patch cord assembly or in other configurations. For example, instead of using heat to bond or fix the wires, a tool of this type could apply an adhesive to the wires after they have been laced into position. Another embodiment of a tool of this type could fix the wires by forming them into shape without bonding the wires. This approach might however depend upon the type of wire used. For example it might be possible to form certain types of solid wires into shape whereas equivalent stranded wires might be impossible to perform in this suggested manner.

The bench fixture 10 includes three subassemblies mounted on a base 32. Cable clamp subassembly 34 moves laterally on the base between a retracted position and a closed position. Lower bonding or heating subassembly 36 extends perpendicular to the direction in which the cable clamp subassembly 34 moves. A pivoted upper bonding or heating subassembly 38 is located above the lower heating subassembly 36 and rotates from the open position shown in FIG. 7 to a position in alignment with the lower heating subassembly as shown in FIG. 8. The upper heating subassembly 38 also moves toward the lower heating subassembly 36 to engage the wires positioned between the two heating subassemblies. This bench tool is connected to a conventional power supply, not shown.

The cable clamp subassembly 34 includes a clamp base or support 42 mounted to shuttle or slide relative to the base 32 by shuttle latch 48 in the direction shown by the double ended arrow. A shuttle latch 48 secures the clamp base in the fully extended position for cable preparation. Shuttle latch 48 is shown in the open position in FIGS. 7 and 8. A groove 44 dimensioned to receive a cable 14 extends along the top of the clamp base 42. A rotatable cable fastener or clasp 46 is mounted on the clamp base. This cable fastener is shown in the open position in FIGS. 7 and 8. After a cable 14 is positioned in the groove 44, the fastener 46 secures the cable in the groove. The fastener will engage the cable at the end of the groove 44 adjacent the heating subassemblies 36 and 38. As will be discussed in more detail subsequently, gripping the cable at the end of the groove 44 will prevent the twisted wire pairs remaining within the outer cable jacket from being untwisted when the ends of the cable are untwisted by the operator. Limiting the extent of untwisted wire will improve the performance of the final cable assembly. Stop blocks 102 are also attached to the clamp support 42. One of these stop blocks 102 is shown in FIGS. 7 and 8. A second identical stop block 102 is mounted on the opposite side of the clamp support 42 and is hidden from view. The function of these stop blocks 102 will be described in more detail as part of the description of the action of the upper heating subassembly 38. A front wire comb 70 is mounted on the clamp support 42 in alignment with the groove 44 adjacent the two heating subassemblies. This comb 44 is shown in more detail in FIG. 9.

Figure 9:
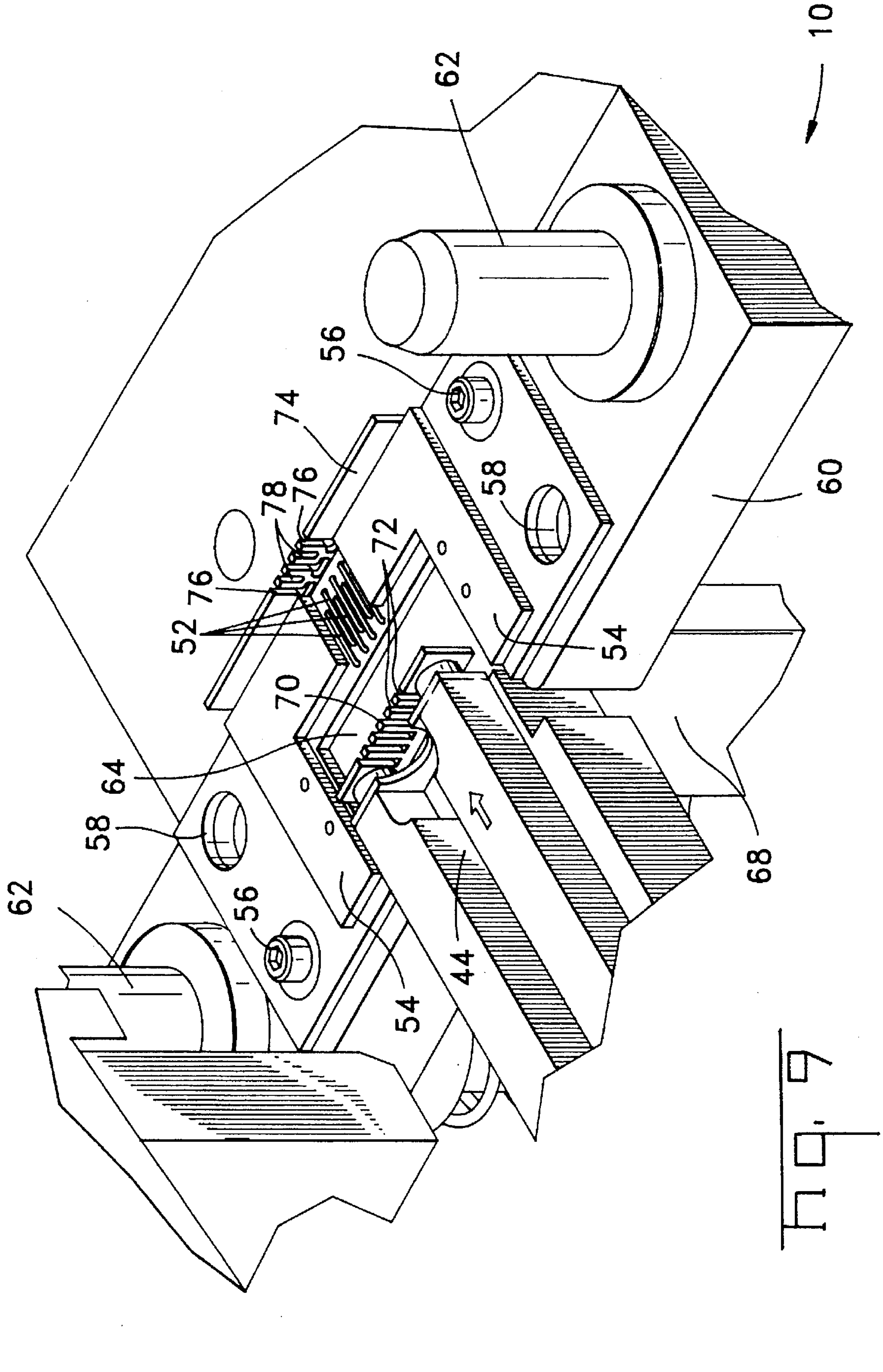
FIG. 9 is an enlarged perspective view of the combs and the lower heating subassembly of the cable preparation fixture.
Figure 10:
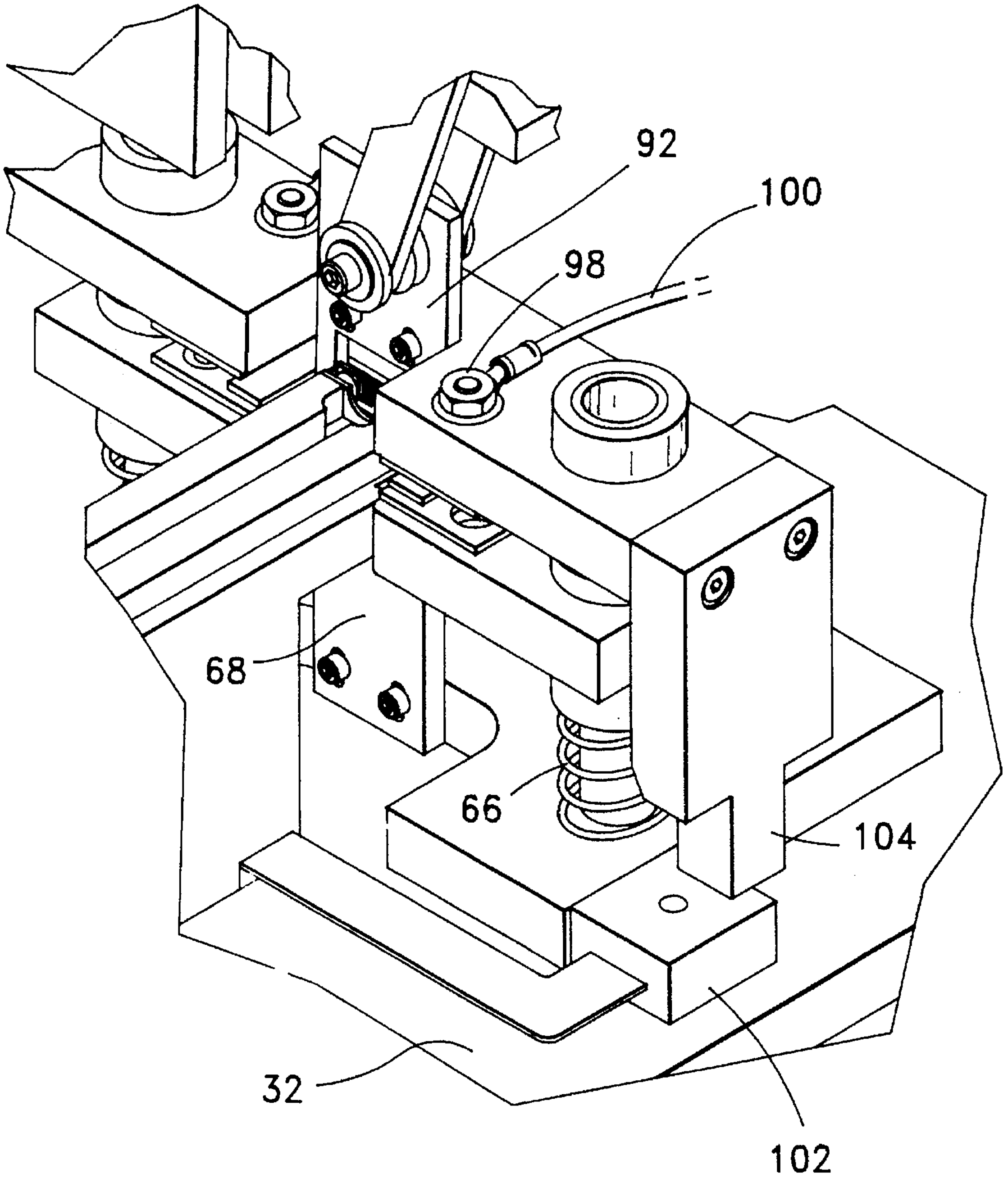
FIG. 10 is an enlarged perspective view showing the upper heating subassembly positioned above the lower heating subassembly as shown in FIG. 9.

The lower bonding or heating subassembly 36 comprises a heating member 50 and a rear comb 74 mounted on an arm or platen 60. The heating member 50 is shown in more detail in FIGS. 9 and 16. Heating member 50 comprises a printed circuit board subassembly with resistance heating element wires 52 soldered to a printed circuit board. These heating element wires are positioned for alignment between adjacent untwisted cable wires 1–8 positioned between the front comb 70 and the rear comb 74. These resistance heating wires are staggered so that they can be soldered to the printed circuit board in a conventional fashion. Two spacers 54 are attached to the printed circuit board on opposite sides of the heating element wires 52. These spacers 54 provide two side edges to hold wires laced side by side between the two combs in proper position during the bonding or heating process. Spacers also provide precise spacing between the lower heating member shown in FIG. 9 and a similar or identical heating member in the upper heating subassembly 38. Since the upper and lower heating elements are precisely positioned relative to the wires, the time and heat necessary to properly bond the wires can be controlled to yield reliable results. The printed circuit board heater subassemblies 50 are bolted to the arm 60 using bolts 56 and these heater members 50 can be easily removed. Different types of wire can be used to fabricate cable assemblies. These different wires can use different insulation material on the wires and can have different outer diameters. Different printed circuit board heater subassemblies 50 precisely configured for use with a particular wire type can then be easily attached to the arm 60. For example the only necessary modification to permit use of the tool with wires with different outer diameters could be replacement of one printed circuit board subassembly 50 with another assembly having a spacer with a different thickness. Alternatively the spacers could be removable and replaceable on a commonly used printed circuit board. The printed circuit board also has clearance recess 58 that is best seen in FIG. 9. These recesses provide clearance for bolts 56 used to attach the upper heater member to the upper assembly. The printed circuit board heater members are attached to the power supply by power supply conductors 100 as shown in FIG. 10. The bolts used to attach the printed circuit boards to the arms can also be used to attach the power supply conductors to both the upper and lower heater members. Traces on the printed circuit board connect the wire heating elements 52 with the power supply connection point. Although two heater members are used in the preferred embodiment of this invention, it should be understood that a single heater member could be used and the wires would be bonded on only one side. Of course the reliability of the ultimate bonded assembly might be affected by the use of a single heater member.

Figure 15:
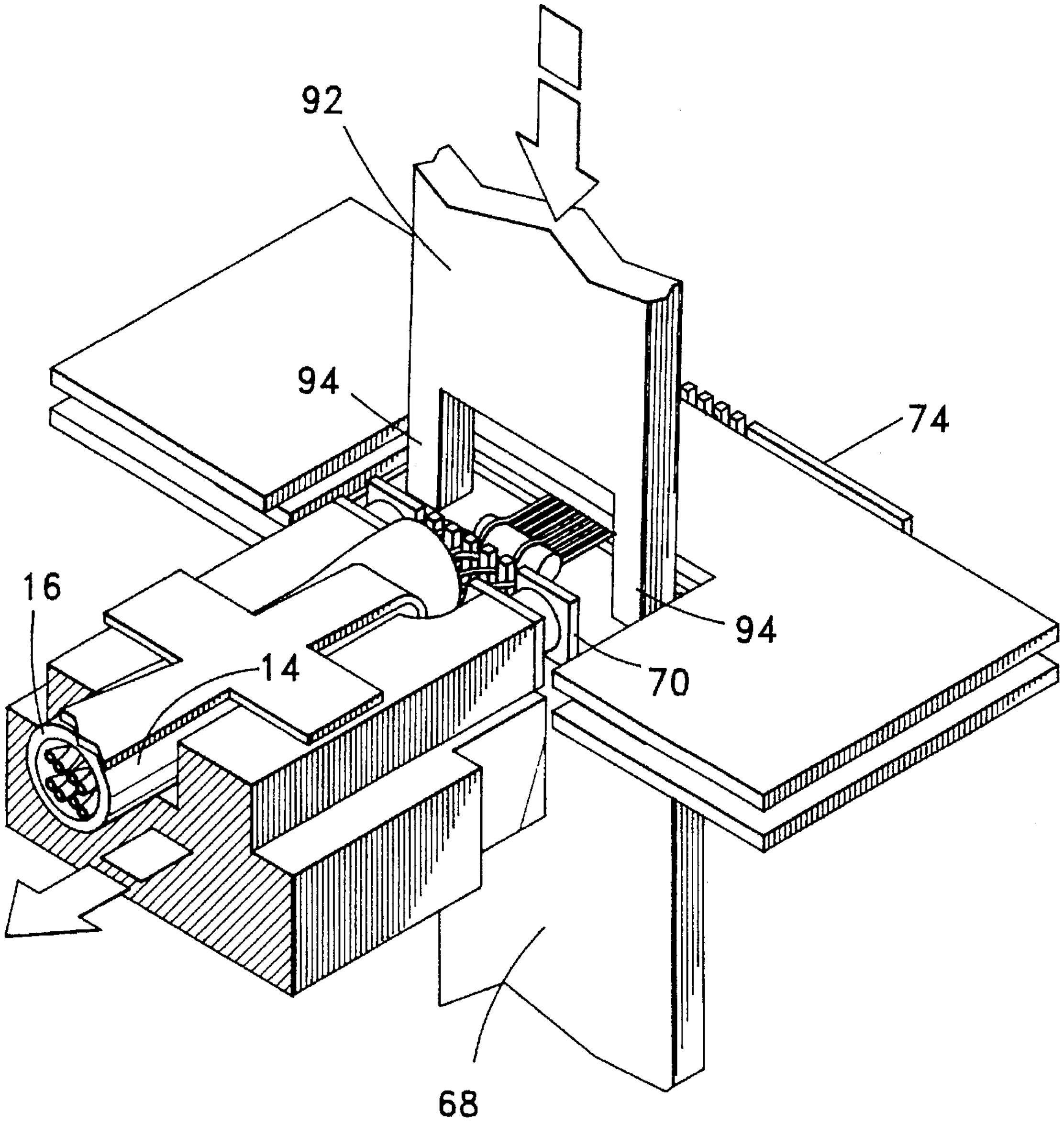
FIG. 15 shows the rearward movement of the cable clamp to position upper and lower cutting blades in position to cut the ends of the wires in the bonded portion.
Figure 17:
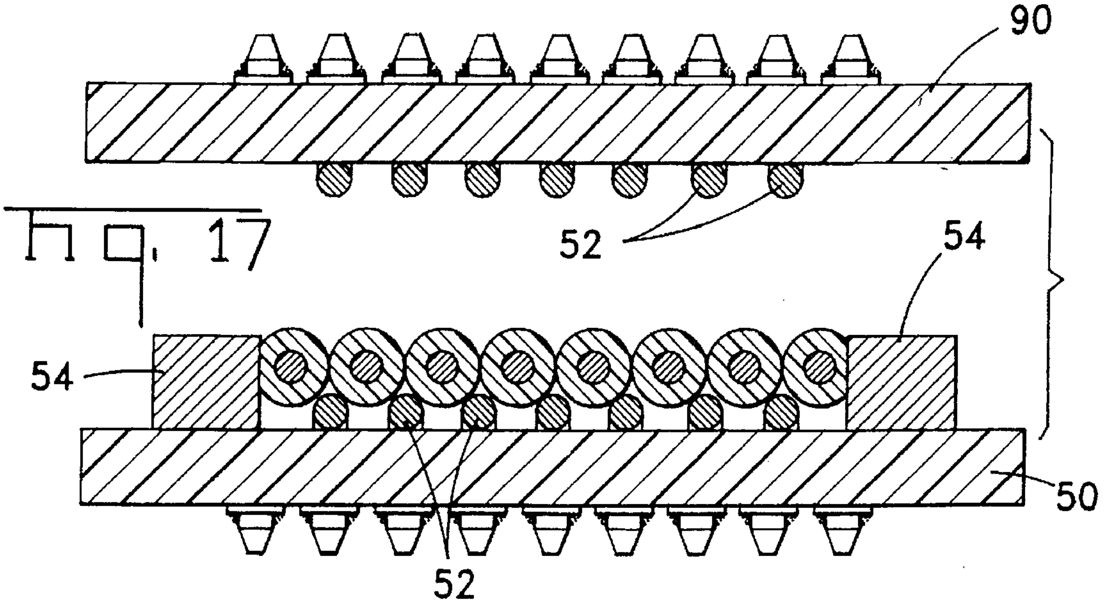

The lower arm 60 is mounted on two guiding posts 62 that extend upward from the base 32. Coil springs 66 support the arm 60. These coil springs exert sufficient force to hold the lower heater subassembly 36 in proper position when the wires are heated. However, a sufficient force can be exerted to permit movement of the lower heater subassembly when the wires are cut. This cutting step will be described in more detail. A central opening 64 is formed on one side of both the lower arm 60 and the printed circuit board heating member 50 to permit the cable clamp subassembly 34 to be moved close to the heating element wires 52 as shown in FIGS. 9 and 15. The untwisted length of the cable wires 1–8 will therefore be reduced with consequent improvement in the performance of the final cable assembly. A lower cutting blade 68 is mounted on the base 32 below this central opening 64.

A rear wire comb 74 is mounted on the arm 60 and the rear of the printed circuit board heating member 50. This rear comb 74 is best seen in FIG. 9 and has three deep channels or wire pair slots 76. A pair of wires can be positioned at the bottom of each of the three deep channels 76. The top portion of each channel 76 is wide enough to permit entry of a single wire. The lower portion of each deep channel 76 is wide enough to permit two wires to lay side by side. When two wires are positioned in the lower portion of the same channel 76, these two wires will be properly aligned relative to the wire heating elements 52. The rear comb also includes two shorter grooves or single wire slots 78. A single groove 78 is located between adjacent channels 76 so that one wire of the second wire pair (3-4) can be positioned in each groove 78. This arrangement is consistent with the wire order dictated for Category 5 modular plug termination. The front wire comb 70 has six slots 72, each of which receives one of the wires 1,2,5,6,7,8 of the three wire pairs which remain side by side in the termination order dictated by Category 5. These are the same wires laced in the deep channels 76 on the rear comb.

Figure 17:
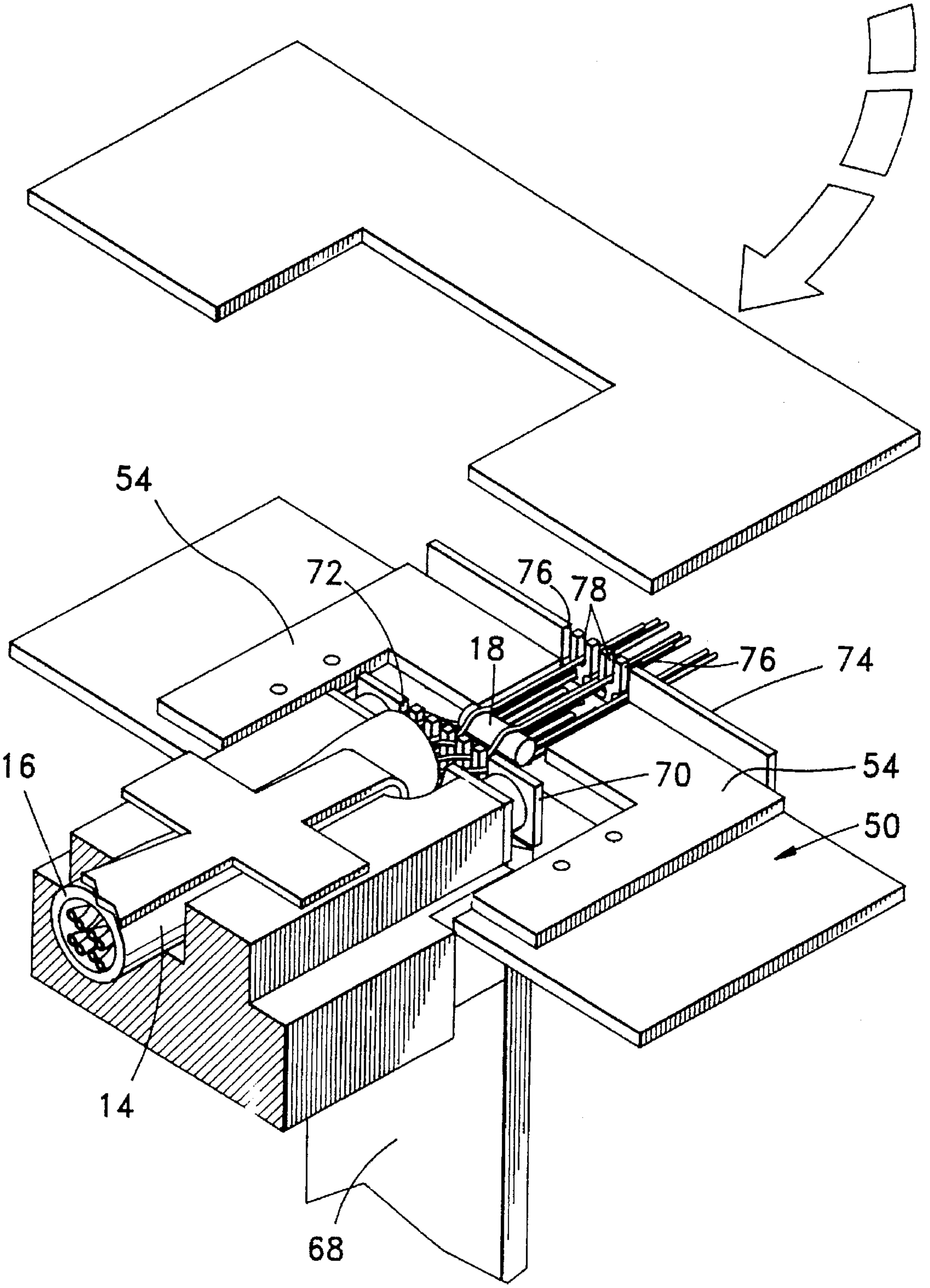
FIG. 17 is a cross sectional view of the upper and lower heating members used to bond the wires prior to engagement of the heating members with the cable.
Figure 18:
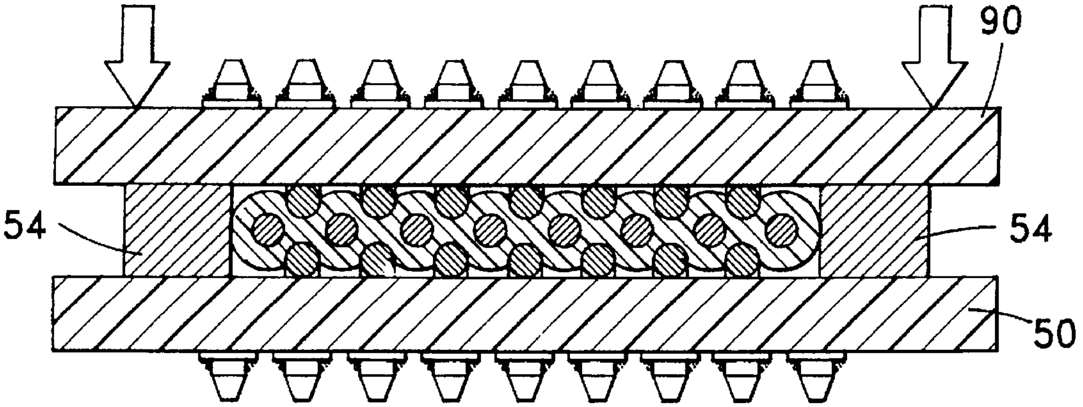
FIG. 18 is a cross sectional view similar to FIG. 17 showing the heating or bonding step.
Figure 19:
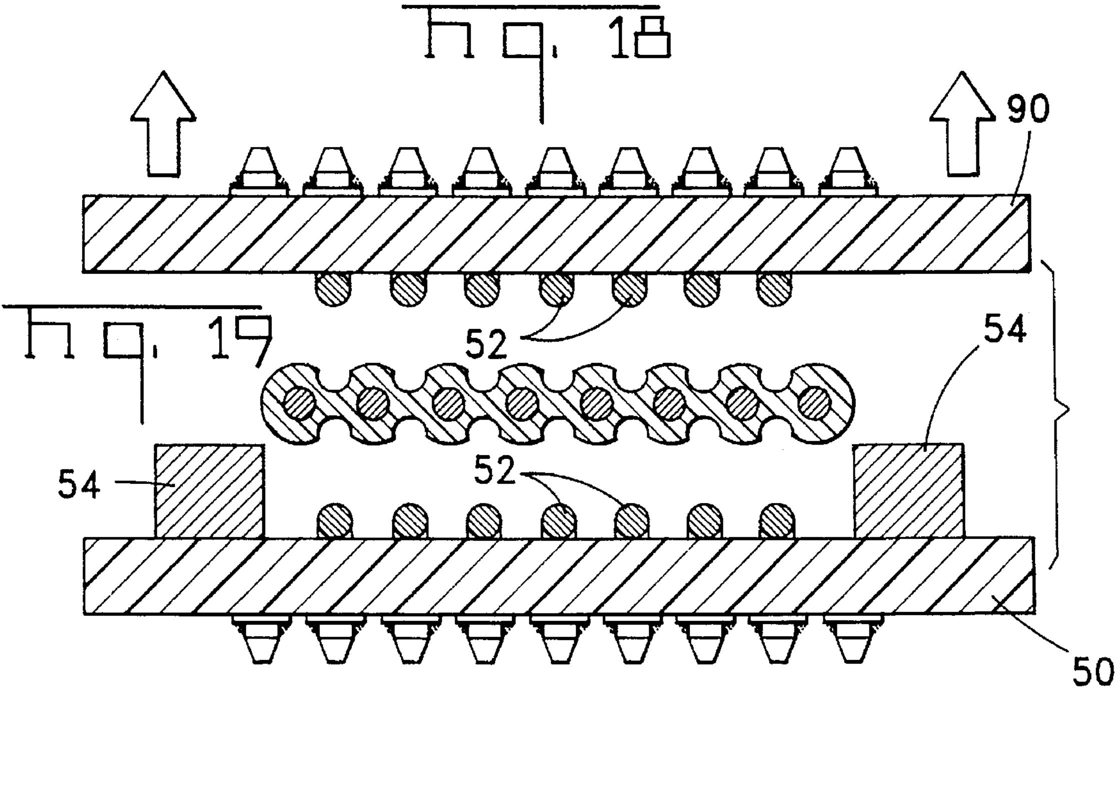
FIG. 19 is a cross sectional view similar to FIGS. 17 and 18 showing the retraction of the heating members or elements.
Figure 20:
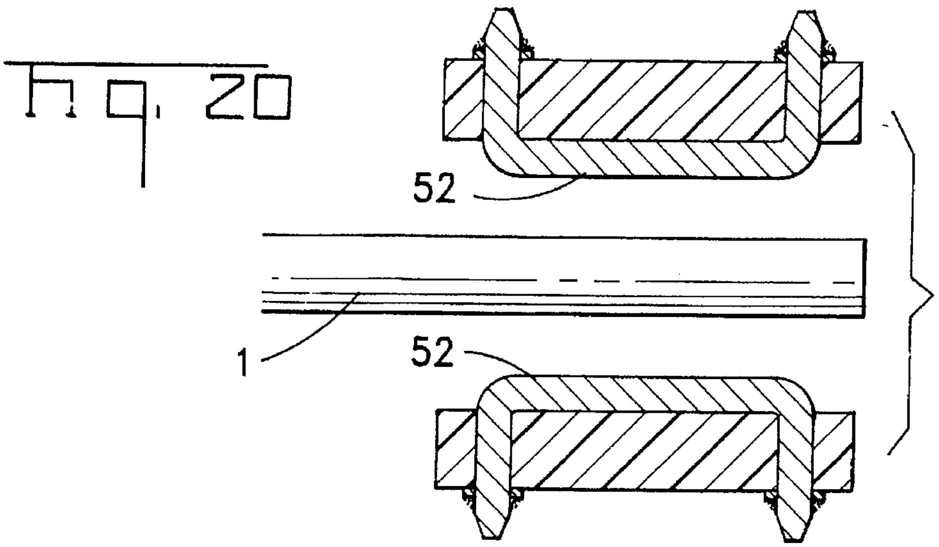
FIG. 20 is a longitudinal section showing upper and lower heating elements and a single wire.
Figure 21:
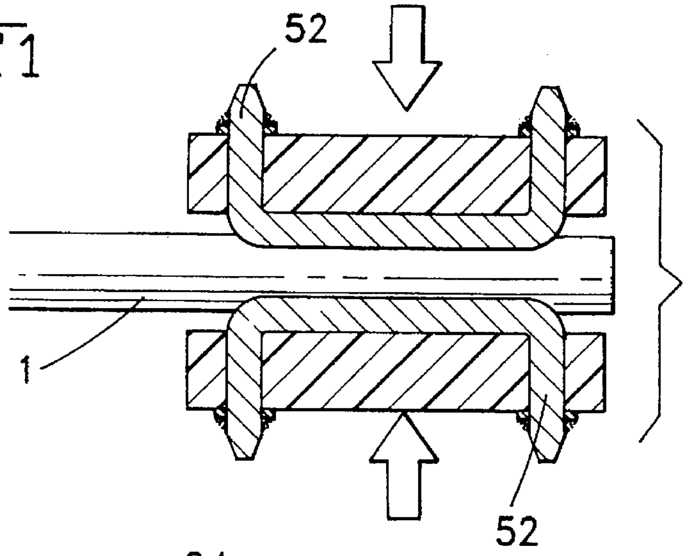
FIG. 21 is a longitudinal section similar to FIG. 20 showing engagement of the heating elements with one wire.

The upper bonding or heater subassembly 38 includes an upper heating member 90 either identical to or substantially similar to the lower heater member 50. In the preferred embodiment, each of these heater member comprises a printed circuit board subassembly having discrete wire heating elements positioned between the side by side wires extending between the combs. The upper heating member may also include spacers on the heating element printed circuit board, or the spacing between the board can be controlled by using spacers on only one of the heating elements as shown in FIGS. 17–19. Since the spacer 54 on the lower heater member 50 also serves to position the wires prior to bonding, it is preferable that a spacer always be included on the lower heater member 50. FIG. 10 shows the use of a nut 98 both to secure the upper printed circuit board heating member 90 to the upper arm 80 and to connect the power supply wire 100.

The upper arm or platen 80 is mounted on the same two guide posts 62 as the lower arm. The upper arm 80 has holes 82 adjacent opposite ends and the entire upper heater subassembly rotates on one of these guide posts 62 between the positions shown in FIGS. 7 and 8. When the upper heater subassembly 38 is rotated into alignment with the lower heater subassembly, the guide hole 82 is positioned over outer post 62 and the upper heater subassembly can then be moved downward relative to the lower heater subassembly 36. Stop arms 104 extend downward from both ends of the upper arm 80. These stop arms 104 engage the stop blocks 102 attached to the cable clamp support 42 when the cable clamp assembly 34 is in the forward or engaged position shown in FIG. 10. Downward movement of both the upper and lower heater subassemblies is prevented after the stop arms 104 engage the stop blocks 102. The upper subassembly 38 can however be moved downward until the spacers 54 on the top and bottom heating members 90, 50 are in engagement. If spacers are used on only one printed circuit board heater subassembly, the spacer width will be sufficient to engage the other printed circuit board before the stop arms 104 and stop blocks 102 prevent further downward movement.

The upper heater subassembly 38 also includes a linkage 84, including a lever 86 connected by a linkage to an upper cutting blade 92. This lever arm 86 would typically be used by an operator to position the upper subassembly with the guide hole 82 in alignment with the post 62. The lever arm 86 cannot be used to bring the upper cutting blade 92 into engagement with the wires 1–8 or with the lower cutting blade 68 because of the engagement of the stop arms 104 with the stop blocks 102. However, the clamp subassembly 34 can be shifted to the retracted position with the spacers on the printed circuit board heating members 50, 90 substantially in engagement after the discrete wires 1–8 are bonded in their predetermined side by side orientation. Movement of the clamp subassembly 34 to the retracted position moves the stop blocks 102 from beneath the stop arms 104 permitting further downward movement of the upper subassembly. The upper cutting blade 92 can therefore be brought into close proximity to the lower cutting blade and the wires 1–8 can be cut to length. Retraction of the clamp subassembly 34 has placed the bonded portion of the cable between the cutting blades and this bonded portion is trimmed, leaving the wires ends bonded together and ready for insertion into a standard modular plug electrical connector.

Figure 11:
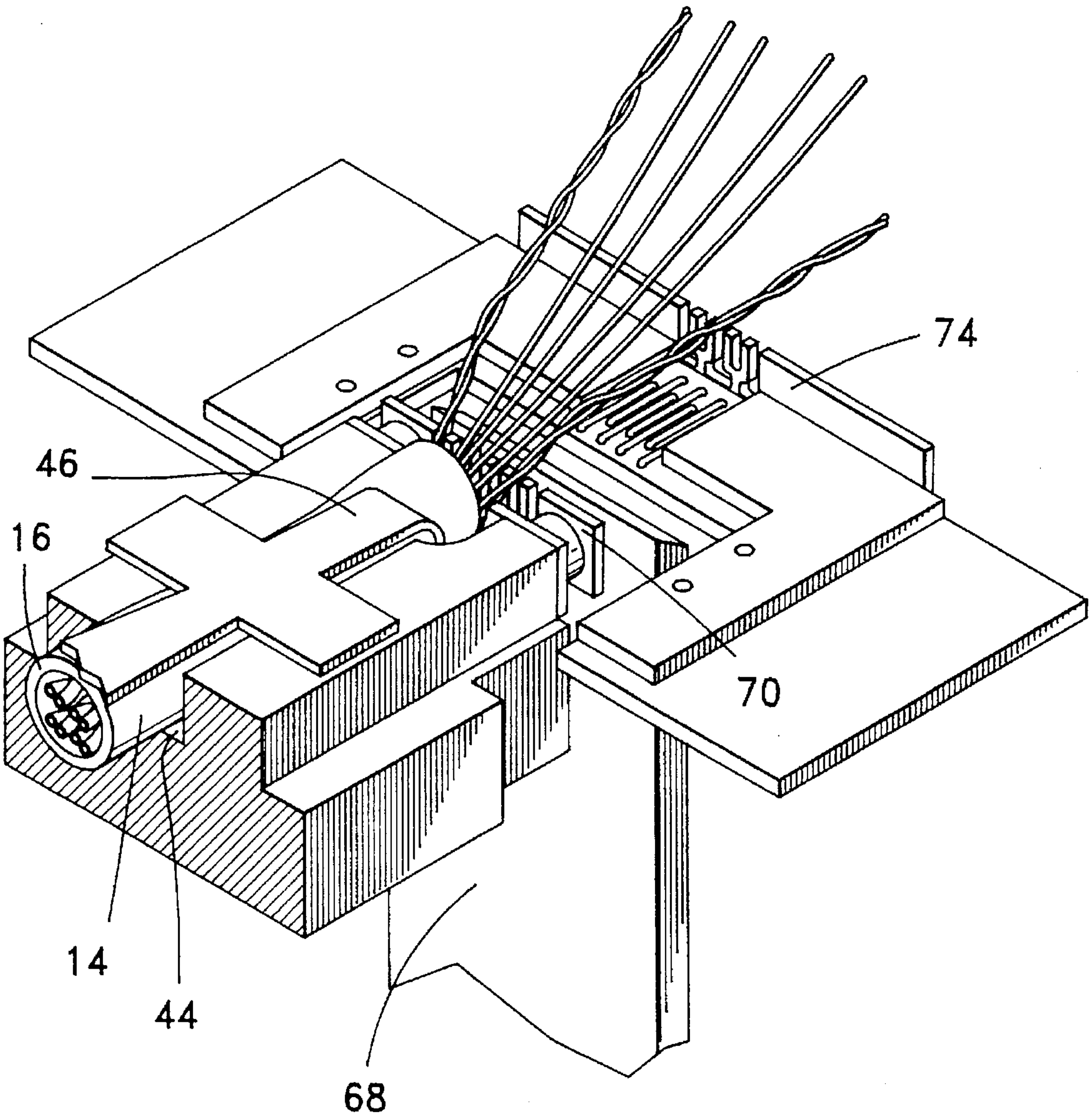
FIG. 11 is a perspective view showing the twisted pair wires being untwisted and positioned in the combs in alignment with the lower heating element.
Figure 12:
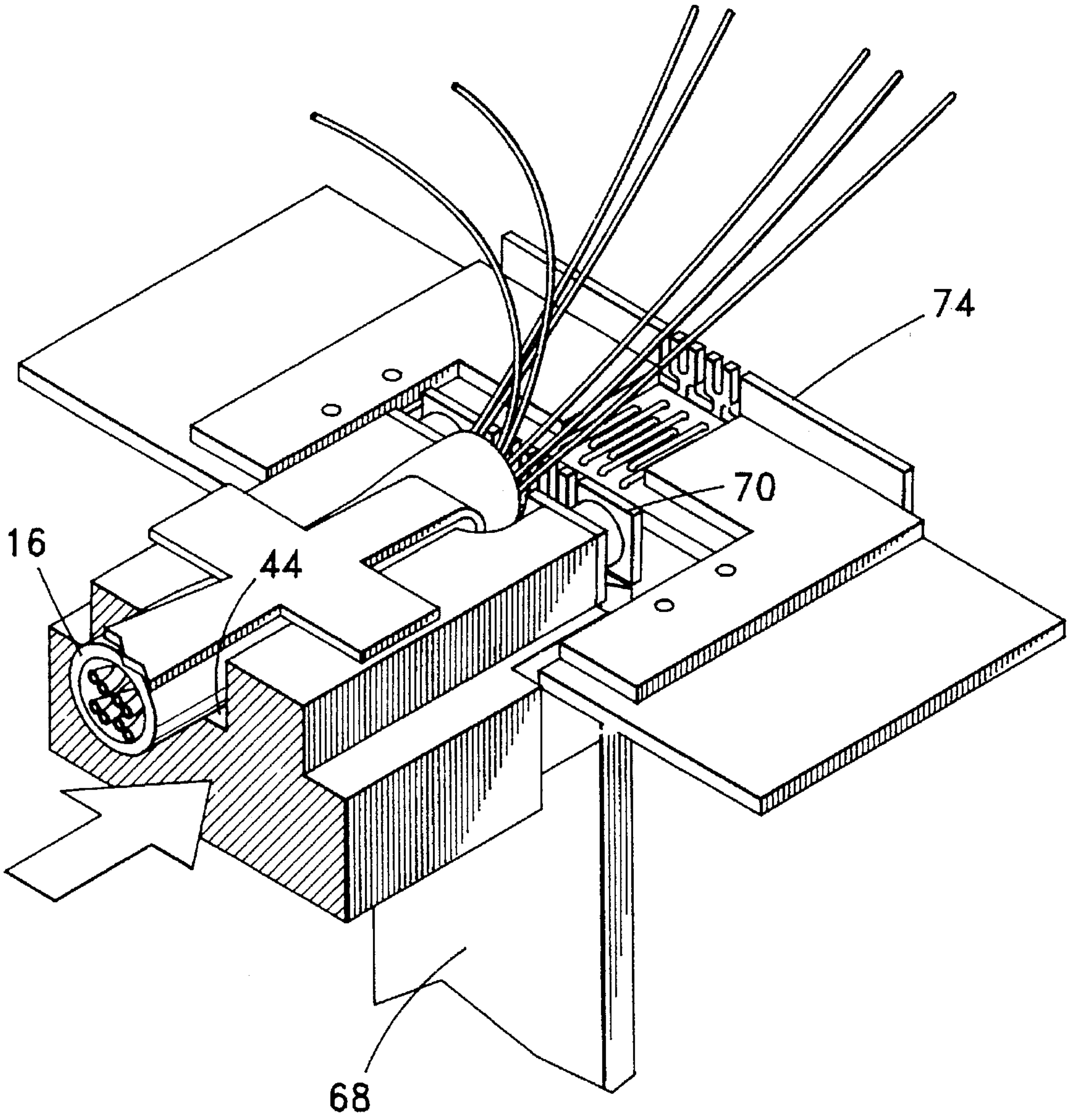
FIG. 12 is a view showing the forward movement of the cable clamp.

Diagrammatic FIGS. 11–15 show the manner in which the wires 1–8 of cable 4 are laced into position in this fixture. First the cable jacket or sheath 16 is cut to expose a length of wire. Approximately three (3) inches are exposed. The cable clamp gripping member 46 engages the cable at the end of cable groove 44 to prevent the twisted pairs remaining within the sheath from becoming untwisted. As shown in FIGS. 11 and 12 the exposed wires are untwisted. These wires can be untwisted either before or after the cable 14 and cable clamp subassembly 43 is moved into engaged position as depicted by the arrow in FIG. 12.

Six of the untwisted cable wires are now laced into the six slots 72 in the front comb 70. These wires are laced in the following order 5,6,2,1,7,8. These six wires are then laced in the three channel or two wire slots 76 in the rear comb 74, with the wires paired in these rear channel in the following manner, 5-6, 2-1, 7-8. As shown in FIG. 13, a cylindrical insert 18 is then positioned over these six wires. The two remaining wires 3, 4 are then laced over the insert 18 and into the single wire slots or grooves 78 in the rear comb 74. The combs and the slots, channels and grooves in these combs will position the wires side by side above the wire heating elements 52 located in the lower printed circuit board heater member 50 in the following order 5,6,3,2,1,4, 7,8. This is the order prescribed for Category 5 modular plug termination as shown in FIG. 6. This is also the order for other RJ-45 modular plug terminations. The wire heating elements 52 are not directly below the cable wires. These wire heating elements are positioned between adjacent wires. The eight wires are also positioned between the spacers 54 on opposite sides of the cable array, and the spacers 54 prevent the wires from spreading out during the bonding or heating process.

Figure 14:
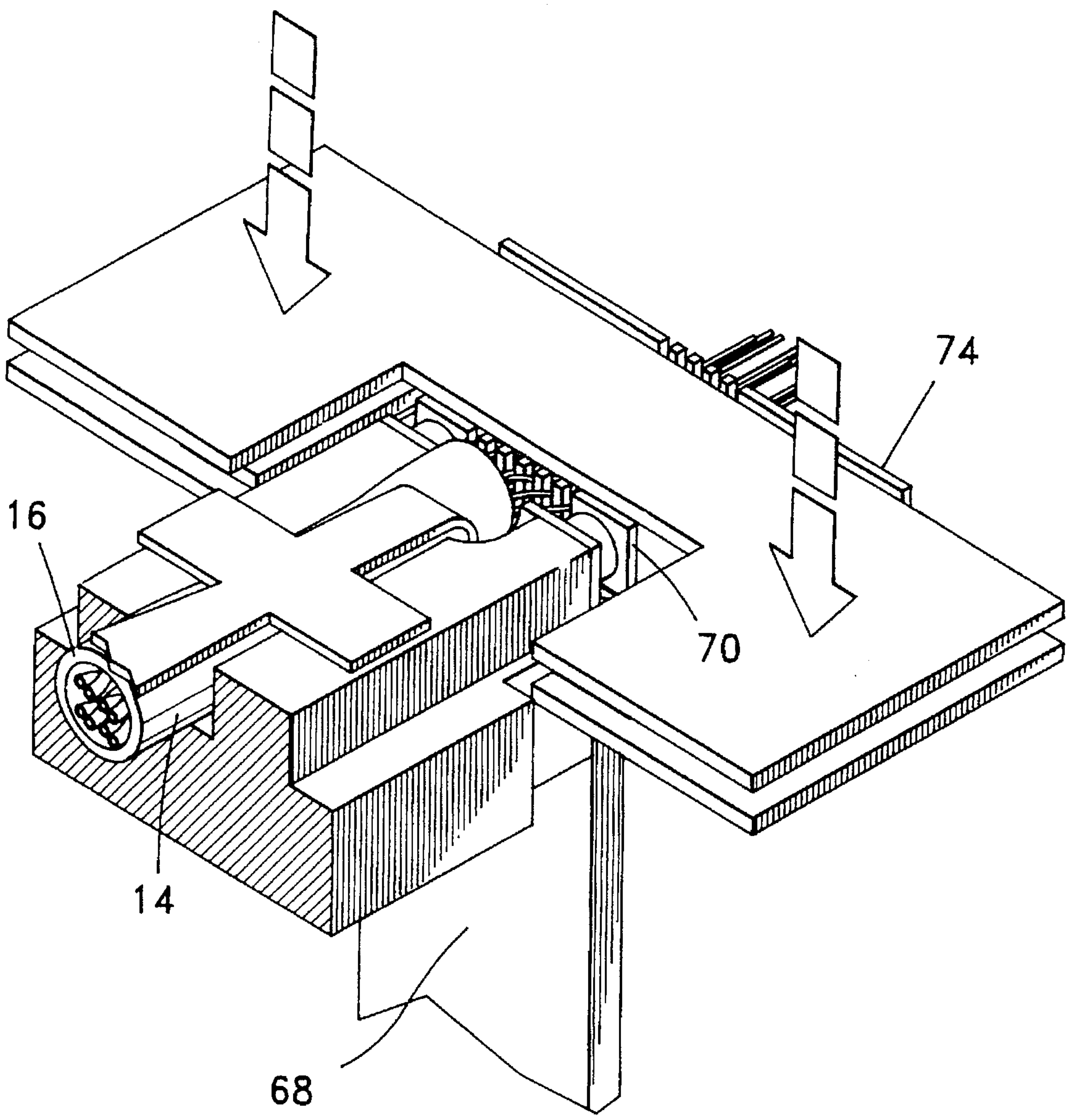
FIG. 14 shows the downward movement of the upper heating subassembly into engagement with the wires between the two combs so that the insulation of adjacent wires can be bonded so that they can subsequently be inserted into a standard modular plug electrical connector.

With the wires in this position, the upper subassembly is rotated into position above the eight side by side cable wires and above the lower heating member 50 and is then lowered into position as shown in FIG. 14. The wire heating elements in the upper and lower heating members 90, 50 are in alignment and offset between the wires. At this point heat is applied to partially melt the insulation surrounding the cable wires and bond a section of these wires together. Typically the heating elements reach a temperature of 300–500 degrees F. (approximately the melting temperature of the wire insulation) and power is applied for about 5 seconds. Time and temperature depend upon wire insulation material and on the power supply.

After a section of the wire is bonded, the cable clamp subassembly 34 is retracted to permit the cutting blades 68 and 92 to engage the bonded section of the wire between the position of the insert 18 and the ends of the cable wires. The wires are cut in the bonded section as shown in FIG. 15. For Category 5 assemblies the wire is cut approximately 0.5 inch from the cut end of the cable sheath, thus limiting the untwisted length of the cable to 0.5 inch. This distance is sufficient to prevent unacceptable near end crosstalk (NEXT) problems and to meet Category 5 requirements. Wires 3 and 4, which are positioned on the opposite sides of wire pair 1-2 are kinked up between the cut end of the cables sheath and the bonded section of the cable. The cross talk performance involving these wires is improved by placing them above the other six wires. The insert 18 is positioned between these wires only to separate wires 3 and 4 from the other wires in this area. Instead of using an insert of this type, a reusable insert or bar that would be part of the preassembly fixture could also be used. That insert would be removed after the wires are bonded, since the "kinked" wires would tend to retain their position.

The operation of the discrete wire heating elements 52 is shown in FIGS. 17–21. Once the wires forming the pairs are positioned properly with respect to the insert 18 and are positioned in the front and rear combs 70, 74, or the insert is omitted, the discrete, insulated wires 1 to 8 are positioned between a sandwich like printed circuit board heating members 50, 90 to bond the discrete cable wires. In any case, the pair of heating members may each comprise a planar body having plural, parallel resistance heating elements 52 arranged along the mating surfaces.

As seen in FIGS. 17 and 18, the heating elements 52 are positioned to lie between adjacent side-by-side cable wires. If the number of wires is "n", the number of heating elements is "n–1". Spacers 54 are shown on both sides of the cable wires. These spacers can be replaced by two wires in which case "n+2" wires would be employed. With the respective heating members positioned in a compressive relationship to the discrete wires as shown in FIG. 18, electrical current may be applied to the heating elements 52 to effect melting and bonding of the insulated wires into a unitary bonded cable section at the end thereof. That is, the respective heating members 50, 90 are brought together to trap and locate the discrete cable wires exactly on preferred 0.040 inch centerlines, where the heating wire elements 52, such as nichrome heating wires, are also spaced on 0.040 inch distances. By this arrangement, including the outermost heating elements, the heating elements act as miniature "V"blocks. With the heating members separated, as shown in FIG. 19, it will be seen that the wires are bonded, and that a scalloped profile is formed. Thereafter, the bonded wires are cut laterally through the scalloped profile by the cutting blades 68, 90 to form a unitary member for insertion and termination within the modular plug. This profile offers a further advantage to the insertion and termination procedure, as hereinafter explained. Another advantage in the use of this type of fixture is the rather quick cool down of the system which allows for a rapid turnaround to repeat the operation with a new and different set of wires. This type of fixture also reduces the chances of accidental burns.

Figure 22:
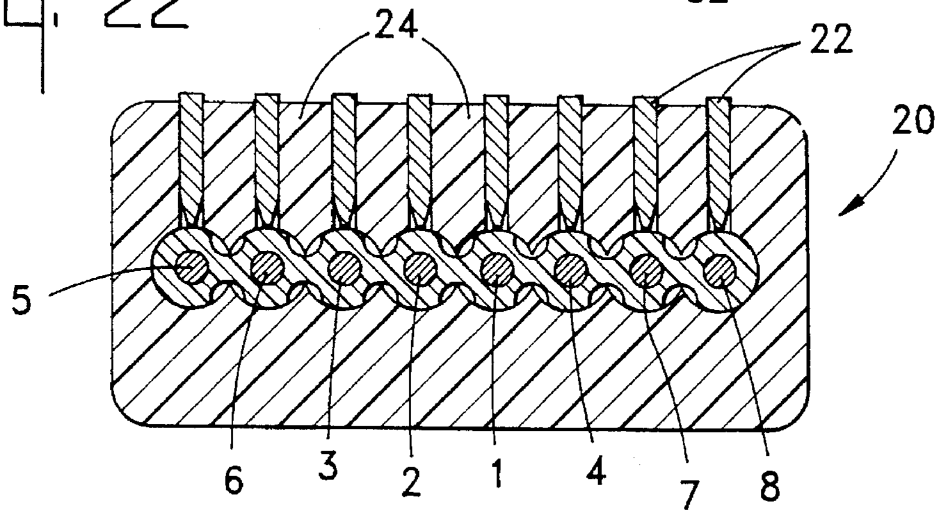
FIG. 22 is a cross section view showing the position of the preformed cable end in a standard modular plug prior to termination of the cable.

FIG. 22 illustrates an inserted and preterminated unitary member in a modular plug 20, where the bonded wires are positioned under the plural terminating blades 22. The passageways into which the bonded wires are received are typically a series of circular communicating sections, where the upper and lower surfaces are scalloped, and the sections are separated by spaced apart opposing ribs 24. With a conventional discrete wire insertion, where the wire is not precisely aligned with the passageway, stubbing can occur. However, with the present invention, where the bonded web between adjacent wires has been modified by the newly impressed profile stubbing problems are greatly minimized. Also, by reshaping or changing the wire profile, it is now possible to use larger diameter wires than heretofore possible. That is, the molded impressions from the scalloped profile create clearances which ease the insertion process and even allow the use of wires exceeding 0.040 inch diameter, for example.

The preferred embodiment of the fixture depicted herein is a bench tool in which a single operator can fix the wires in a Category 5 cable in the preselected Category order by preparing one end of the cable at a time. This invention is not however limited only to that application. The basic method and apparatus described with reference to the preferred embodiment can be use in an automatic tool for fabricating patch cords. In such an automatic machine, a single cable end could be prepared during each cycle of the machine. Alternatively an automatic machine could employ two cable end preparation stations and both ends of a patch cord assembly could be prepared during each cycle. An automatic machine could also include connector attachment and termination as part of its operation.

This invention has also been described with reference to the preparation of Category 5 cables. In its broader its broader aspects this invention is applicable to other configurations. For example, this fixture could also be used to prepare cable for termination to an RJ-45 modular plug for use in a Category 3 or 4 cable assembly. In that event the insert, which is used to improve the cross talk performance involving wires 3 and 4 to achieve Category 5 performance levels, would not be necessary. In its even broader aspects, this invention could be used for preparing cable for termination to other electrical connectors. Therefore it would be appreciated by one skilled in the art that the invention as described in the following claims is not limited to the specific embodiment depicted herein.

We claim:

1. Apparatus for positioning individual wires of twisted wire pairs in a cable in a preselected pattern for subsequent termination in an electrical connector, comprising:

a cable clamp for securing the cable with separate twisted wire pairs extending longitudinally beyond the cable clamp;

first and second combs, the first comb being located adjacent to the cable clamp and having slots for positioning six wires in three said wire pairs in side by side lateral alignment, the second comb being longitudinally spaced from the first comb and having three channels each of which includes a section wide enough to receive side by side both wires of a respective one of said three wire pairs, the second comb further having two grooves for receiving respective wires of a fourth said wire pair, the first and second combs being aligned to position the individual wires of the four said wire pairs side by side in the preselected pattern; and bonding means positioned between the first and second combs for bonding together the individual wires, thereby forming a bonded portion of the cable so that the individual wires are secured in the preselected pattern for subsequent termination in the electrical connector.

2. The apparatus of claim 1 wherein the bonding means comprises opposed first and second bonding members which are movable relatively together and apart.

3. The apparatus of claim 2 wherein the first and second bonding members each comprise heating members.

4. The apparatus of claim 3 wherein each heating member comprises an array of side by side heating elements, each comprising a heating wire extending parallel to the cable wires positioned between the first and second combs.

5. The apparatus of claim 4 wherein the heating wires are offset relative to the cable wires, the heating members being positioned so that the heating wires engage insulation on adjacent cable wires to bond adjacent cable wires together.

6. The apparatus of claim 2 further comprising wire cutting blades positioned to cut the wires in the bonded portion of the cable.

7. The apparatus of claim 6 wherein the cable clamp is movable relative to the first and second bonding members so that movement of the cable clamp moves the bonded portion of the cable into alignment with the cutting blades so that the cutting blades can cut the cable wires in the bonded portion of the cable.

8. The apparatus of claim 7 wherein the cutting blades comprise first and second cutting blades, the second cutting blade being movable relative to the second bonding member after the cable clamp is moved to position the bonded portion of the cable in alignment with the cutting blades.

9. The apparatus of claim 8 further comprising a stop limiting movement of the second cutting blade until the cable clamp is moved to position the bonded portion of the cable in alignment with the cutting blades.

10. The apparatus of claim 2 wherein the second bonding member is shiftable between first, second and third positions, the second bonding member in the first position being laterally spaced from the first bonding member to permit cable wires to be positioned in the first and second combs, the second bonding member in the second position being above and spaced from the first bonding member with the second bonding member being shifted toward the first bonding member from the second to the third position.

11. The apparatus of claim 1 wherein at least one said channel in the second comb is located between the two grooves so that the two wires of the fourth wire pair are separated by at least one of the three wire pairs in the bonded portion of the cable.

12. The apparatus of claim 1 wherein the first and second combs each comprises a flat plate, the grooves, channels and slots being open along the top of the plate so that wires may be laced therein.

13. The apparatus of claim 12 wherein the sections of the channels in which the both wires can be positioned side by side comprise enlarged sections adjacent a base of the channels.

14. The apparatus of claim 2 wherein the first and second bonding members are each respectively mounted on first and second arms, each arm being movable relative to a base.

15. The apparatus of claim 14 wherein two posts extend upwardly from the base, the first arm being mounted on the posts and spring loaded relative to the base.

16. The apparatus of claim 15 wherein the second arm is rotatable relative to a first said post, the second arm including a hole through which the second post extends when the second arm is located above the first arm with the first and second bonding members in alignment with the second bonding member above the first bonding member.

17. The apparatus of claim 16 wherein the second arm and an upper cutting blade are each attached to a lever for moving the upper cutting blade and the second bonding member toward the cable wires positioned in the first and second combs.

18. The apparatus of claim 17 wherein the cable clamp is shiftable relative to the base and a stop is mounted on the cable clamp to engage an extension of the second arm when the cable wires are bonded by the first and second bonding members to prevent the upper cutting blade from engaging the cable wires until the cable clamp is moved to shift the bonded portion of the cable relative to the first and second bonding members so that the upper cutting blade may then be moved further downward to cut the bonded portion of the cable.

19. The apparatus of claim 14 wherein the first and second bonding members are removably mounted on the first and second arms so that bonding members dimensioned for use with wires of different construction can be selectively mounted on the first and second arms.

20. Apparatus for use in assembling a Category 5 patch cord assembly including a cable, substantially circular in cross-section and including four twisted wire pairs, numbered respectively 1-2, 3-4, 5-6, and 7-8 positioned within an outer jacket and connected on each end to an eight position modular plug electrical connector in numbered order 5,6,3,2,1,4,7,8, the apparatus comprising:

a cable clamp including means for engaging the cable adjacent a stripped end of the cable jacket with the four wire pairs extending longitudinally beyond the cable jacket and for preventing untwisting of portions of the wire pairs remaining in the jacket;

a first comb for initially positioning six wires of three said wire pairs laterally side by side in numbered order 5,6,2,1,7,8;

a second comb longitudinally spaced from the first comb and including three comb channels for positioning each of the six wires in one of the channels along with the other wire of its said wire pair in numbered order 5-6, 2-1, 7-8, and including grooves for positioning the wires 3 and 4 on opposite sides of the wire pair 2-1, the first and second combs being configured to position the eight wires laterally side by side adjacent the second comb;

a bonding member adjacent to the second comb including bonding elements for bonding the wires together in numbered order 5,6,3,2,1,4,7,8 to form a bonded wire portion of the cable, the bonding member being spaced from the first comb for receipt of an insert for positioning the wires 3 and 4 on an opposite side of the insert from the wires 5,6,2,1,7,8 to reduce cross talk involving the wires 3 and 4; and wire cutting blades positioned to cut the wires in the bonded wire portion of the cable;

whereby the wires are bonded together for insertion into a modular plug electrical connector, and the bonded wire portion of the cable is sufficiently short so that the patch cord assembly exhibits Category 5 performance.

* * * * *